United States Patent [19]

Orii

[11] 4,141,042

[45] Feb. 20, 1979

[54] AUTOMATIC FINE TUNING CIRCUIT IN TELEVISION RECEIVER

[75] Inventor: Toshio Orii, Daito, Japan

[73] Assignee: Sanyo Electric Co., Ltd., Osaka, Japan

[21] Appl. No.: 850,391

[22] Filed: Nov. 10, 1977

[30] Foreign Application Priority Data

Nov. 10, 1976 [JP] Japan .................................. 51/136684
Mar. 26, 1977 [JP] Japan .................................. 52/34813

[51] Int. Cl.² .............................................. H04N 5/44
[52] U.S. Cl. ..................................... 358/195; 325/422
[58] Field of Search ............... 358/195, 174, 175, 188; 325/422

[56] References Cited

U.S. PATENT DOCUMENTS

3,821,654  6/1974  Anrooy ............................ 358/195 X
3,873,922  3/1975  Aizawa et al. .................... 358/195 X

*Primary Examiner*—Robert L. Richardson
*Attorney, Agent, or Firm*—Armstrong, Nikaido, Marmelstein & Kubovcik

[57] ABSTRACT

An automatic fine tuning circuit in a television receiver, comprising a tuner including a voltage controlled variable reactance device constituting a tuning circuit, a video intermediate frequency amplifier for amplifying an intermediate frequency signal from the tuner, an interstage coil coupled to the video intermediate frequency amplifier, a synchronous detector having a high quality tuning characteristic of the video carrier frequency and coupled to the interstage coil for detecting the video signal through synchronous detection, a frequency discriminator having a tuning circuit coupled to the last stage of the video intermediate frequency amplifier in a direct current manner for discriminating the shift of the video carrier frequency for providing an automatic fine tuning control signal, the automatic fine tuning control signal being applied to the tuner for controlling the voltage controlled variable reactance device for the automatic fine tuning operation, a video amplifier coupled to the synchronous detector, an automatic gain control coupled to the video amplifier for providing to the video intermediate frequency amplifier and the tuner an automatic gain control signal, at least the video intermediate frequency amplifier, the frequency discriminator for automatic fine tuning control and the synchronous detector being implemented in a single integrated circuit.

8 Claims, 11 Drawing Figures

AUTOMATIC FINE TUNING CIRCUIT IN TELEVISION RECEIVER

BACKGROUND OF THE INVENTION

1. Field of the Invention

The present invention relates to an automatic fine tuning control in a television receiver. More specifically, the present invention relates to an improved automatic fine tuning circuit suited for implementation in an integrated circuit in a television receiver employing a synchronous detector as a video detector.

2. Description of the Prior Art

Recently a synchronous detector has been widely used as a video detector in television receivers. The reason is that a synchronous detector has the advantages of high detection efficiency and less generation of undesired harmonics and beats. In addition, a synchronous detector operates with a low input and is easy of coupling to a low gain video intermediate frequency amplifier. For this reason, a synchronous detector has been much more employed particularly in color television receivers implemented by integrated circuits.

Figure 1:
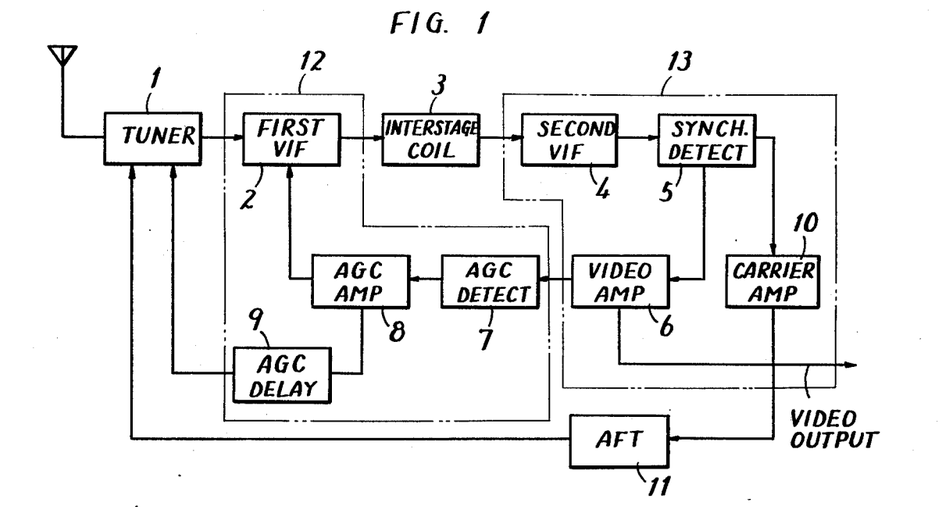
FIG. 1 shows a major portion of a conventional color television receiver implemented by integrated circuits and employing a synchronous detector as a video detector.

FIG. 1 shows a major portion of a conventional color television receiver implemented by integrated circuits and employing a synchronous detector as a video detector. Referring to FIG. 1, a television broadcast signal as received by an antenna is applied to a tuner 1. As well known, the tuner 1 typically comprises a high frequency amplifier for selectively amplifying a selected high frequency signal of a carrier frequency corresponding to the respective channel, a local oscillator for generating a local oscillation signal of a frequency different by a predetermined frequency difference from the carrier frequency of the selected high frequency signal, and a mixer for mixing the selected high frequency signal with the local oscillation signal for providing an intermediate frequency signal of the frequency commensurate with the said difference frequency. The intermediate frequency signal is obtained from the mixer of the tuner. The local oscillator comprises a tuning circuit comprising a voltage controlled variable reactance device such as a voltage controlled variable capacitance diode. As to be described subsequently, the voltage controlled variable reactance device of the local oscillator is supplied with an automatic fine tuning control signal to achieve an automatic fine tuning operation. The tuner 1 is also structured to be responsive to an automatic gain control signal to be controlled of the gain thereof, as well known to those skilled in the art. The intermediate frequency signal as obtained from the mixer of the tuner 1 is applied to a first video intermediate frequency amplifier 2. The first video intermediate frequency amplifier 2 is also structured to be responsive to an automatic gain control signal to be controlled of the gain thereof. The intermediate frequency signal as amplified by the first video intermediate frequency amplifier 2 is applied through an interstage coil 3 to a second video intermediate frequency amplifier 4. As well known, the intermediate frequency signal includes a video intermediate frequency signal of a video carrier signal of a predetermined video carrier frequency as amplitude modulated and a sound intermediate frequency signal of a sound carrier signal of a predetermined frequency lower than the said video carrier frequency by a predetermined frequency difference commensurate with a sound intercarrier frequency. The former intermediate frequency signal is referred to as "video intermediate frequency signal" and the latter intermediate frequency signal is referred to as "sound intermediate frequency signal" in the present specification. Similarly, the former carrier signal is referred to as "video carrier signal" and the latter carrier signal is referred to as "sound carrier signal" in the present specification.

Figure 2:
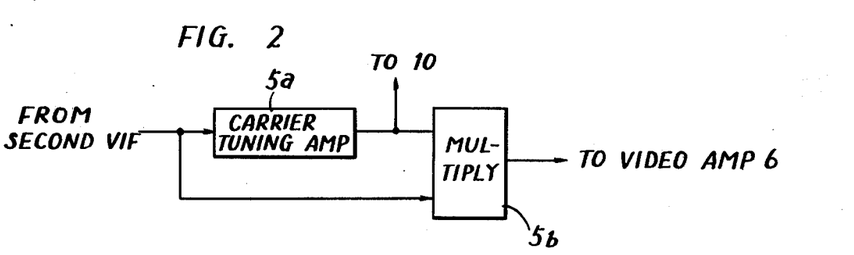
FIG. 2 shows a typical synchronous detector employing a carrier tuned circuit of a high quality factor.

The intermediate frequency signal as amplified by the second video intermediate frequency amplifier 4 is applied to a synchronous detector 5. As well known, a synchronous detector serves to multiply a video carrier signal with a video intermediate frequency signal to provide a detected video signal by way of a product. To that end, a synchronous detector comprises means for generating a video carrier signal of the same phase and frequency as that of the video intermediate frequency signal and means for multiplying the video carrier signal with the video intermediate frequency signal. The said carrier signal generating means may comprise a local oscillator responsive to the video intermediate frequency signal to be operable in synchronism with the video intermediate frequency signal. Alternatively, the video carrier signal generating means may comprise a video carrier tuned circuit of a high quality factor coupled to the video intermediate frequency amplifier. Referring to FIG. 2, a typical synchronous detector employing a video carrier tuned circuit of a high quality factor is shown. Referring to FIG. 2, the video intermediate frequency signal as obtained from the second video intermediate frequency amplifier 4 is applied to a video carrier tuning circuit 5a and the output from the video carrier tuning circuit 5a and the said video intermediate frequency signal per se are applied to a multiplier 5b. The multiplier 5b serves to multiply the video carrier signal by the video intermediate frequency signal to provide a detected video signal by way of a product, as well known to those skilled in the art.

The detected video signal is applied to a video amplifier 6 and the output therefrom is withdrawn to be utilized to drive a video circuit, as well known. The video signal as obtained from the video amplifier 6 is further applied to an automatic gain control detector 7, wherein a signal representative of the magnitude of the video signal is obtained by way of an automatic gain control signal. The automatic gain control signal thus obtained is applied to an automatic gain control amplifier 8 and the automatic gain control signal as amplified by the amplifier 8 is applied to the video intermediate frequency amplifier 2 as an automatic gain control signal. The automatic gain control signal as obtained from the amplifier 8 is further applied through an automatic gain control delay circuit 9 to the tuner 1 as a delayed automatic gain control signal, as well known.

It is pointed out that in FIG. 1 television receiver the blocks 2, 7, 8 and 9 are implemented in an integrated circuit as encircled in a dotted line as 12 and the blocks 4, 5, 6 and 10 are also implemented in a separate integrated circuit as encircled in a dotted line as 13.

Referring again to FIG. 2, the output from the video carrier tuning circuit 5a is applied to a video carrier amplifier 10 to amplify the video carrier signal to the magnitude sufficient enough to drive a so called automatic fine tuning control circuit 11. Typically, the automatic fine tuning control circuit 11 comprises a frequency discriminator adapted to discriminate the frequency shift of the video carrier signal from the predetermined video carrier frequency. As well known, the frequency discriminator 11 serves to detect a drift of the video carrier frequency of the video intermediate frequency signal to provide a correction signal, which is applied to the voltage controlled variable reactance device of the local oscillator in the tuner 1, thereby to collect the drift of the video carrier frequency.

According to the conventional automatic fine tuning circuit described with reference to FIGS. 1 and 2, a video carrier signal is obtained from a video carrier tuning circuit 5a. In fact, this makes it possible to obtain with certainty the video carrier signal in a relatively large level on the occasion of normal operation by the receiver, thereby to ensure a proper automatic fine tuning operation. Nevertheless, a disadvantage is encountered that if and when the local oscillation frequency of the tuner is shifted from a normal frequency on the occasion of a transient operation such as at the time of channel switching, at the time of turning on of a power supply, and the like, a pseudo carrier signal is generated through intermodulation of the video and sound carrier signals, which pseudo carrier signal causes malfunction in an automatic fine tuning circuit 11. Therefore, the cause of occurrence of such a pseudo carrier signal in the conventional television receivers as shown in FIGS. 1 and 2 is first considered, and then the malfunction of the automatic fine tuning control circuit because of such a pseudo carrier signal will be considered.

In general, the local oscillation frequency of a local oscillator in the tuner 1 has a tendency of being shifted away from a normal frequency corresponding to the respective channel on the occasion of the above described transient operation such as at the time of channel switching, at the time of turning on of a power supply, and the like. If and when the local oscillation frequency of the local oscillator in the tuner is shifted in the higher direction on such occasion, then the sound carrier signal could cause malfunction of the automatic fine tuning circuit, as well known. On the other hand, if and when the local oscillation frequency of the local oscillator is shifted in a lower direction, then the above described pseudo carrier signal could cause malfunction of the automatic fine tuning circuit, as well known. As to be more fully described subsequently, such pseudo carrier signal is caused by virtue of internal modulation or mutual modulation of the video carrier signal and the sound carrier signal in the video intermediate frequency amplifiers 2 and 4, as well known to those skilled in the art.

Figure 3:
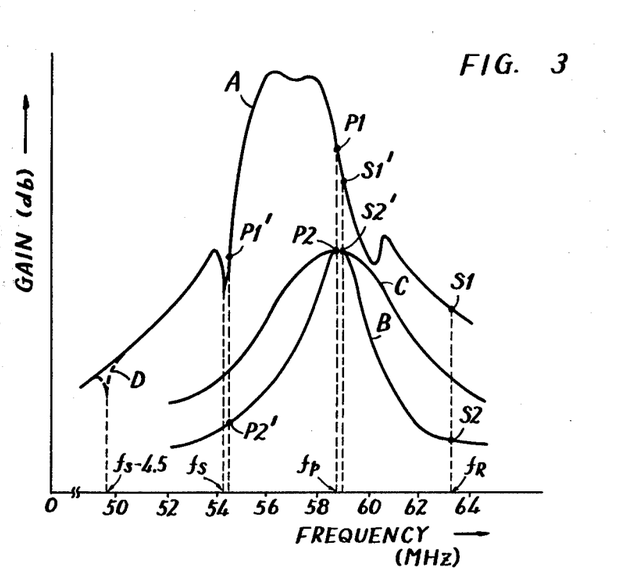
FIG. 3 shows an overall frequency characteristic of the video intermediate frequency circuit and frequency characteristic of the video carrier tuning circuit in the synchronous detector and the automatic fine tuning control circuit.

FIG. 3 shows an overall frequency characteristic (A) of the video intermediate frequency circuit including the first video intermediate frequency amplifier 2, the interstage coil 3 and the second video intermediate frequency amplifier 4, and a frequency characteristic (B) of the video carrier tuning circuit 5a in the synchronous detector 5. FIG. 3 shows the characteristic of an example of the Japanese television standard, in which the video carrier frequency is 58.75MHz, and the sound carrier frequency is 54.25MHz, the difference being 4.5MHz. Referring to the overall frequency characteristic (A) of the video intermediate frequency circuit, the circuit is adjusted such that the video carrier frequency $f_p$ comes to the intermediate of the right side slope, an absorbing bottom point of an adjacent channel trap comes to the bottom of the right side slope, and an absorbing point of the sound trap comes to the bottom of the left side sope. The pseudo carrier signal of the frequency higher by the video/sound frequency difference appears at the frequency point spaced apart from the video carrier frequency in the higher frequency derection.

With reference to FIG. 3, now consider a case where a local oscillation frequency $f_L$ becomes lower by approximately 4.5MHz of the said video/sound frequency difference. Then, it follows that the video carrier signal $f_p$ moves from the frequency points p1 and p2 on the characteristic curves (A) and (B) to the frequency points p1' and p2' on the characteristic curves (A) and (B), respectively. Accordingly, the frequency of the video carrier signal $f_p$ approaches an absorbing frequency point of the sound trap in the frequency characteristic curve (A) in the video intermediate frequency circuit, whereby the gain of the shifted video carrier signal $f_p$ by the video intermediate frequency is decreased. On the other hand, it is recalled that the quality factor of the video carrier frequency tuning circuit 5a is very high and steep, as seen by the frequency characteristic curve (B). Because of a decreased gain of the video intermediate frequency circuit at the absorbing frequency point by the sound trap and the high quality factor tuning frequency characteristic of the video carrier frequency tuning circuit 5a, the shifted video carrier signal $f_p$ obtained from the carrier frequency tuning circuit 5a becomes extremely small, if and when the local oscillation frequency $f_L$ becomes lower by approximately the said difference frequency of 4.5MHz. As a result, the detection efficiency of the synchronous detector 5 becomes very low. Nevertheless, a high quality factor of the tuning frequency characteristic curve (B) of the video carrier frequency tuning circuit 5a is necessarily required from the standpoint of a requied high detection efficiency of the synchronous detector 5 on the occasion of a normal operation of a television receiver.

If and when the detection efficiency of the synchronous detector 5 becomes lower, than the input to the video amplifier 6 becomes small, and the output from the automatic gain control detector 7 also becomes small. As a result, the tuner 1 and the first video intermediate frequency amplifier 2 that are controlled with the outputs from the automatic gain control delay circuit 9 and the automatic gain control amplifier 8, respectively, operate with the maximum gain.

As briefly described previously, since the intermediate frequency signal obtained from the tuner 1 includes the video carrier signal $f_p$ and the sound carrier signal $f_S$ the frequency of which is lower than that of the video carrier signal by the frequency difference of 4.5MHz, both carrier signals cause internal modulation or mutual modulation in the video intermediate frequency circuit, as well known to those skilled in the art, thereby to generate a pseudo carrier signal $f_R$ the frequency of which is higher than that of the video carrier signal $f_p$ by the frequency difference of 4.5MHz. The above described internal modulation causing such pseudo carrier signal $f_R$ is conspicuous, particularly in case where the video intermediate frequency circuit is implemented with an integrated circuit. In the example of the FIG. 1 diagram, two portions 12 and 13 encircled with dotted lines are each implemented with a single chip integrated circuit as described previously. In addition, the above described first video intermediate frequency amplifier 2 operates with the maximum gain, if and when the local oscillation frequency $f_L$ of the tuner 1 becomes lower than the normal frequency corresponding to the respective channel by the said frequency difference of 4.5MHz. It should be noted that just at that time the pseudo carrier signal $f_R$ has been shifted from the frequency points s1 and s2 to the frequency points s1' and s2' along the frequency characteristic curves (A) and (B), respectively, in FIG. 3. As is clear from FIG. 3, it would be appreciated that even if the pseudo carrier signal $f_R$ per se generated in the video intermediate frequency circuit is smaller than the shifted video carrier signal $f_p$, that has now come to the absorbing frequency point of the sound trap, the shifted pseudo carrier signal $f_R$ obtained from the video carrier frequency tuning circuit 5a is larger than the shifted video carrier signal $f_p$ obtained from the video carrier frequency tuning circuit 5a.

As the pseudo carrier signal $f_R$ obtained from the video carrier frequency tuning circuit 5a becomes larger than the video carrier signal $f_p$ obtained from the video carrier frequency tuning circuit 5a, it follows that the pseudo carrier signal $f_R$ comes to be frequency discriminated by the automatic fine tuning control circuit 11 and an output voltage by virtue of the pseudo carrier signal $f_R$ comes to appear from the automatic fine tuning control circuit 11.

Figure 4:
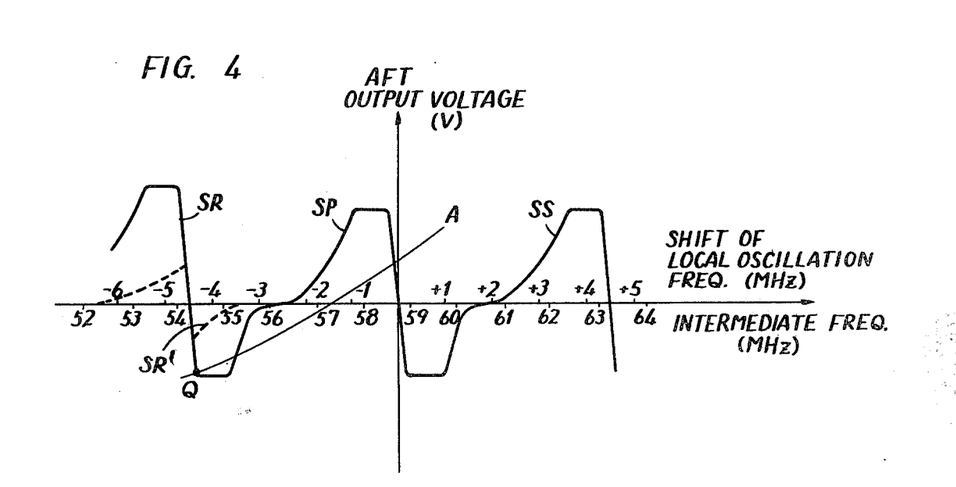
FIG. 4 shows a frequency versus output voltage characteristic of the automatic fine tuning circuit.

FIG. 4 shows a frequency versus output voltage characteristic of the automatic fine tuning circuit 11. Referring to FIG. 4, it is seen that the normal S letter shaped characteristic curve $S_P$ by virtue of the video carrier signal $f_p$ appears centering on the prescribed video carrier frequency of 58.75MHz and in addition another similar S letter shaped characteristic curve $S_R$ by virtue of the said pseudo carrier signal $f_R$ has appeared centering on the frequency lower than the said video carrier frequency by the frequency difference of 4.5MHz. In actuality, still another S letter shaped characteristic curve $s_S$ by virtue of the sound carrier signal $f_S$ appears centering on the frequency higher than the video carrier frequency by the frequency difference of 4.5MHs, in case where the local oscillation signal $f_L$ is shifted from the normal frequency corresponding to the respective channel toward a higher frequency. Referring to FIG. 4, there is shown as a curve (A) the characteristic of the voltage applied to the voltage controlled variable reactance device in the local oscillator in the tuner 11 versus the local oscillation frequency of the local oscillator of the tuner 11 in case where the local oscillation frequency is shifted in the lower frequency direction. Thus, it would be appreciated that if and when the local oscillation frequency $f_L$ is shifted toward a lower frequency it could happen that the automatic frequency tuning control becomes stabilized at the frequency point Q, resulting in occurrence of malfunction in the automatic fine tuning control circuit 11. It should be noted that the present invention is aimed to eliminate such malfunction in the automatic fine tuning control circuit 11 that could be caused by virtue of the pseudo carrier signal $f_R$.

From the foregoing description, it has become apparent, that in case of a television receiver employing a synchronous detector as a video detector, if and when the local oscillation frequency of the tuner is shifted from the normal frequency corresponding to the respective channel toward the lower frequency on the occasion of a transient operation such as at the time of channel switching, at the time of turning on of the power supply, and the like, a pseudo carrier signal $f_R$ becomes dominant as compared with the video carrier signal $f_p$ at the output of the video carrier frequency tuning circuit 5a in the synchronous detector because of a required high quality factor characteristic of the video carrier frequency tuning circuit, which pseudo carrier signal $f_R$ could cause malfunction in the automatic fine tuning circuit 11.

In order to eliminate such malfunction in the automatic fine tuning circuit, the following two approaches could be considered. The first approach is to disable temporarily the automatic fine tuning control circuit on the occasion of the above described transient operation period. The second approach is to suppress the shift of the local oscillation frequency $f_L$ on the occasion of the above described transient operation to such a range that does not cause malfunction, say approximately 4MHz, as seen from FIG. 4. However, the former approach requires a malfunction preventing circuit including a switching device and the like on/off controlled on the occasion of the above described transient operation, while the latter approach requires manual operation for adjusting for each receiver the difference of a variable range of the local oscillation frequency $f_L$. Thus, these approaches inevitably results in an increase of the manufacturing cost.

SUMMARY OF THE INVENTION

Briefly described, the present invention comprises an automatic fine tuning circuit in a television receiver, comprising: a tuner for selecting a television high frequency signal including voltage controlled variable reactance means, a video intermediate frequency amplifier coupled to the tuner for amplifying the intermediate frequency signal from the tuner, a video intermediate frequency signal of a video carrier signal and a sound intermediate frequency signal of a sound carrier signal of the intermediate frequency signal causing intermodulation in the video intermediate frequency amplifier for providing a pseudo carrier signal, a synchronous detector coupled to the video intermediate frequency amplifier for detecting a video signal from the video intermediate frequency signal through synchronous detection, said synchronous detector having a high quality factor tuning characteristics of the video carrier frequency, a frequency discriminator coupled to the video intermediate frequency amplifier through a direct current transfer path for discriminating the frequency shift of the video carrier frequency of the video intermediate frequency signal for providing an automatic fine tuning control signal being applied to the voltage controlled variable reactance means in the tuner for the automatic fine tuning operation, said video intermediate frequency amplifier, said synchronous detector and said frequency discriminator being implemented in a single integrated circuit, said frequency discriminator having a video carrier frequency tuning circuit being selected to be of a low quality factor such that even if said video carrier frequency is shifted toward a lower frequency the video carrier signal is dominant with respect to said pseudo carrier signal in said frequency discriminator, whereby malfunction of the automatic fine tuning control by virtue of said pseudo carrier signal is adapted to be prevented.

If and when the local oscillation frequency is shifted from the normal frequency corresponding to the respective channel by the frequency difference between the video and sound carrier signals in the lower frequency direction, the said pseudo carrier signal and the video carrier signal come to the frequencies of the normal video and sound carrier signals, respectively. According to the present invention, however, since the frequency discriminator for an automatic fine tuning operation is selected to be of a low quality factor, the shifted video carrier signal is dominant with respect to the shifted pseudo carrier signal. As a result, even in such a shifted frequency situation, frequency discrimination is effected with respect to the video carrier signal. As a result, malfunction by virtue of the pseudo carrier signal can be eliminated.

In a preferred embodiment of the present invention, another trap is provided in the video intermediate frequency amplifier to absorb the frequency lower than the frequency of the normal sound carrier signal by the frequency difference between the video and sound carrier signals. Provision of such additional trap serves to suppress generation of the above described pseudo carrier signal caused by intermodulation of the video and sound carrier signals. As a result, malfunciton of the automatic fine tuning operation by virtue of a pseudo carrier signal generated through intermodulation of the video and sound carrier signals can be effectively eliminated. In view of the fact that a pseudo carrier signal through intermodulation of the video and sound carrier signals is liable to occur in a television receiver implemented with integrated circuits, the present invention can be advantageously employed in a television receiver implemented with integrated circuit and employing a synchronous detector.

In a further preferred embodiment of the present invention, a combination of a video carrier frequency tuning amplifier of a low quality factor and an amplitude limiter is provided between the video intermediate frequency amplifier and the frequency discriminator for automatic fine tuning operation. Preferably, such a video carrier frequency tuning amplifier and amplitude limiter are also incorporated in a single integrated circuit together with the above described components. In such a case, a tank circuit including a capacitor and a coil is externally connected to the video carrier frequency tuning amplifier. When a tank circuit including a capacitor and a coil is connected to the video carrier frequency tuning amplifier, a consideration is given such that the impedance of the tank circuit with respect to the video carrier freuqency tuning amplifeir is adjusted by proper selection of the tap of the coil such that the gain of the video carrier frequency tuning amplifier is substantially the same irrespective of the difference of the video carrier frequency depending on the television standard system to be employed with respect to the limiting level of the amplitude limiter, whereby a common type of integrated circuit can be adapted to different television standard systems.

Therefore, a principal object of the present invention is to provide an improved automatic fine tuning control in a television receiver employing a synchronous detector as a video detector.

Another object of the present invention is to provide an improved automatic fine tuning control in a television receiver employing a synchronous detector as a video detector, wherein malfunction of an autoamtic fine tuning operation by virtue of a pseudo carrier signal caused by intermodulation of the video and sound carrier signals is eliminated.

A further object of the present invention is to provide an improved automatic fine tuning control in a television receiver employing a synchronous detector as a video detector, particularly suited for implementation by an integrated circuit, wherein malfunction of an autoamtic fine tuning control operation by virtue of a pseudo carrier signal caused by intermodulation of the video and sound carrier signals is eliminated.

Still another object of the present invention is to provide an improved automatic fine tuning control in a television receiver employing a synchronous detector as a video detector, implemented by an integrated circuit so as to be adapted to different television standard systems, wherein malfunction of an automatic fine tuning control operation by virtue of a pseudo carrier signal caused by intermodualtion of the video and sound carrier signals is eliminated.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 5:
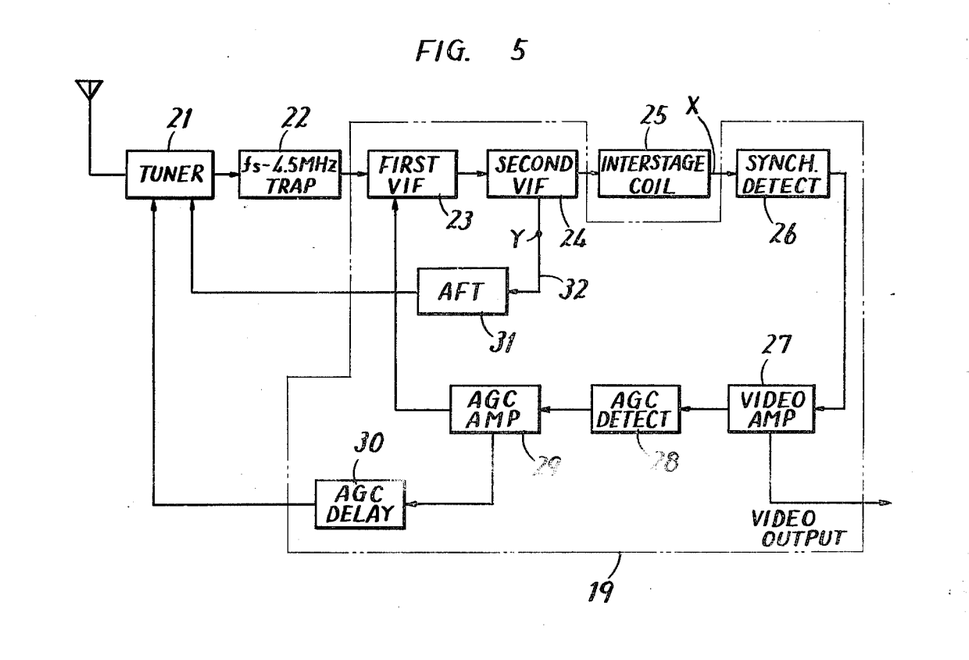
FIG. 5 shows a block diagram of a major portion of a television receiver employing the present invention.

FIG. 5 shows a block diagram of a major portion of a television receiver employing the present invention. A television high frequency signal as received by an antenna is applied to a tuner 21. The tuner 21 typically comprises a high frequency amplifier for selectively amplifying a desired television high frequency signal of a carrier frequency corresponding to the selected channel, a local oscillator for generating a local oscillation signal the frequency of which is adapted to be different from the frequency of the carrier in the television high frequency signal by a predetermined frequency difference commensurate with a video intermediate frequency signal, and a mixer for mixing the high frequency signal as amplified by the high frequency amplifier with the local oscillation signal from the local oscillator to provide an intermediate frequency signal. As described previously, the tuner 21 is structured such that the local oscillator comprises a voltage controlled variable reactance device constituting a tuning circuit for the purpose of an automatic fine tuning operation. The tuner 21 is further structured to be responsive to an automatic gain control signal to be controlled of the gain thereof. The intermediate frequency signal as obtained from the tuner 21 is applied to a first video intermediate frequency amplifier 23 through a frequency trap 22, an absorbing frequency of which is selected to be lower than the frequency of the sound trap by the frequency difference between the video and the sound carrier signals. As well known, the intermediate frequency signal includes a video intermediate frequency signal of a video carrier signal of the frequency of 58.75MHz and a sound intermediate frequency signal of a sound carrier signal of the frequency of 54.25MHz. The first video intermediate frequency amplifier 23 is also structured to be responsive to an automatic gain control signal to be controlled of the gain thereof. The video intermediate frequency signal as amplified by the first video intermediate fruquency amplifier 23 is applied to a second video intermediate freuqency amplifier 24. The output from the second video intermediate frequency amplifier 24 is applied through an interstage coil 25 to a synchronous detector 26. As described previously, the synchronous detector 26 is adapted to have a tuning characteristic of a high quality factor with respect to the video carrier frequency. A detailed structure of the synchronous detector 26 was previously described with reference to FIG. 2. A video detected output from the synchronous detector 26 is applied to a video amplifier 27. An amplified video signal is withdrawn from the video amplifier 27 to drive the subsequent video circuit. The video signal as amplified by the video amplifier 27 is also applied to an automatic gain control detector 28, wherein a signal representative of the magnitude of the video signal is obtained for the purpose of the automatic gain control. The automatic gain control signal obtained from the detector 28 is applied to an automatic gain control amplifier 29. An amplified automatic gain control signal obtained from the amplifier 29 is applied to the first video intermediate frequency amplifier 23 for the purpose of an automatic gain control operation. The output from the automatic gain control amplifier 29 is also applied to an automatic gain control delay circuit 30 and a delayed automatic gain control signal is applied to the tuner 21. In the FIG. 5 embodiment the blocks 23, 24, 26, 27, 28, 29, 30 and 31 are implemented in a signal integrated circuit as encircled in a dotted line as 19.

According to the present invention, a signal for use in an automatic fine tuning control is obtained directly from the video intermediate frequency amplifier by the use of a video carrier frequency tuning circuit of a low quality factor. More specifically, according to the embodiment shown, the output from the second video intermediate frequency amplifier 24 is applied to an automatic fine tuning control circuit 31 through a direct current transfer path, i.e. in a direct current manner. Typically, the automatic fine tuning control circuit 31 comprises a video carrier frequency tuning circuit of a relatively low quality factor and a freuqency discriminator coupled thereto for discriminating the frequency shift of the amplified video intermediate frequency signal from the video carrier frequency. The output from the frequency discriminator in the automatic fine tuning control circuit 31 is applied to the above described voltage controlled variable reactance device in the local oscillator in the tuner 21 for the purpose of automatic fine tuning control operation. Referring again to FIG. 3, the frequency characteristic of the video carrier frequency tuning circuit in the automatic fine tuning control circuit 31 is shown by the curve (C) and the frequency characteristic of the frequency trap 22 is shown by the curve (D). Thus, it is to be pointed out that an essential feature of the present invention is a direct coupling of the automatic fine tuning control 31 from the video intermediate frequency amplifier by the use of a tuning circuit of a relatively low quality factor tuning characteristic with respect to the video carrier frequency and another feature of the present invention is a provision of a trap having an absorbing frequency lower than the sound trap frequency by the frequency difference between the video and sound carrier signals.

Figure 6:
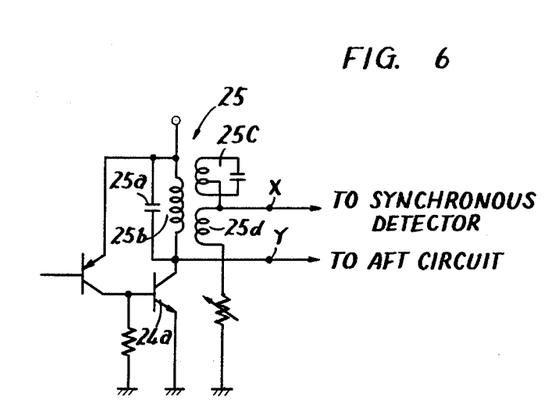
FIG. 6 shows a schematic diagram of the coupling portion of the second video intermediate frequency amplifier and the interstage coil.

FIG. 6 shows a schematic diagram of the coupling portion of the second video intermediate frequency amplifier 24 and the interstage coil 25. Referring to FIG. 6, the second video intermediate amplifier 24 comprises an NPN type transistor 24a and the interstage coil 25 comprises a primary winding 25b, which is coupled to a secondary winding 25d and also coupled to a third winding 25c. The winding 25b is shunted by a capacitor 25a, thereby to form a tuning circuit tuned to the frequency of the video intermediate frequency signal. The third coil 25c is also shunted by a capacitor, thereby to form a tuning circuit tuned to the frequency of the sound carrier signal, whereby a sound trap is formed. The secondary winding 25d is connected at one end thereof to the third winding 25c. The primary winding 25b is connected in series with the collector electrode of the transistor 24a. The junction X between the secondary winding 25d and the third winding 25c is connected to the synchronous detector. On the other hand, the junction Y between the transistor 24a and the coil 25b is connected in a direct current manner or through a direct current transfer path to the automatic fine tuning control 31.

Figure 7:
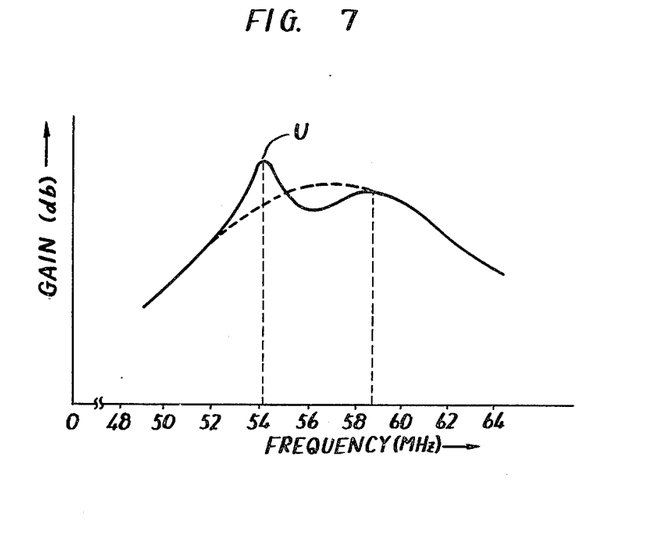
FIG. 7 shows a frequency characteristic of only the video intermediate frequency amplifiers as seen from the input terminal of the automatic fine tuning control.

With the above described structure, the overall frequency characteristic of the video intermediate frequency circuit including the trap 22, the first and second video intermediate frequency amplifiers 23 and 24, and the interstage coil 25 is a combination of the characteristic curves (A) and (D) and the frequency characteristic of the video carrier frequency tuning circuit in the automatic fine tuning control circuit 31 is as shown by the curve (C), while the frequency characteristic of the video carrier frequency tuning circuit in the synchronous detector 26 remains the same as the curve (B). On the other hand, the frequency characteristic of only the first and second video intermediate frequency amplifiers 23 and 24 as seen from the input terminal Y of the automatic fine tuning control circuit 31 is as shown in FIG. 7, wherein a peak point U by virtue of the sound trap 25c appears at 54.25MHz. The reason why the peak point U occurs in FIG. 7 is that the sound trap 25 in FIG. 6 is of a parallel resonance type, which increases the collector load impedance to the last stage transistor 24a of the second video intermediate frequency amplifier at the above described frequency.

In operation, if and when the local oscillation frequency $f_L$ of the local oscillator in the tuner 21 becomes lower than the normal frequency corresponding to the respective channel by the frequency difference of 4.5MHz between the video and sound carrier signals, then, as seen from FIG. 3, the shifted sound carrier signal $f_S$ in the input of the first video intermediate frequency amplifier 23 is made extremely small by means of the trap 22. As a result, the above described pseudo carrier signal $f_R$ becomes difficult to occur because of the small sound carrier signal. Even if the pseudo carrier signal $f_R$ occurs in the first video intermediate frequency amplifier 23, originally the pseudo carrier signal $f_R$ is small as compared with the video carrier signal $f_p$. As seen from FIG. 7, the frequency characteristic of the video intermediate frequency circuit is rather flat with respect to the normal video and sound carrier signals. In addition, according to the present invention, the video carrier signal is withdrawn through a video carrier frequency tuning circuit of a relatively low quality factor as shown by the curve (C) in FIG. 3. Therefore, even if the local oscillation frequency of the tuner is shifted in a lower frequency direction by the frequency difference of 4.5MHz and the frequency of the pseudo carrier signal $f_R$ occurring in the video intermediate frequency amplifiers is accordingly shifted so that the pseudo carrier signal becomes larger, the shifted pseudo carrier signal $f_R$ does not become larger than the shifted video carrier signal $f_p$ at the input of the frequency discriminator of the automatic fine tuning control circuit 31. This means that the output voltage characteristic by virtue of the pseudo carrier signal $f_R$ of the frequency discriminator 31, i.e. the S letter shaped curve $S_R$ in FIG. 4 becomes as small as shown in dotted line identified as $S_{R'}$. As a result, malfunction of the automatic fine tuning control circuit 31 by virtue of the pseudo carrier signal $f_R$ is difficult to occur.

Meanwhile, in case where the sound trap 25c is not provided in the interstage coil 25 as shown in FIG. 6, the frequency characteristic of FIG. 7 becomes as shown in dotted line. However, the pseudo carrier signal $f_R$ per se generated in the video intermediate frequency amplifiers is much smaller than the normal video carrier signal $f_p$ as described previously. Accordingly, even if the local oscillation frequency $f_L$ of the local oscillator in the tuner is shifted in the lower direction by the frequency difference of 4.5MHz, the shifted pseudo carrier signal $f_R$ is still smaller than the shifted video carrier signal $f_p$ in such a situation at the input of the frequency discriminator. Thus, even in such a case, malfunction in the automatic fine tuning control circuit 31 can be effectively prevented.

As well known, several different television standard systems have been adopted in different countries throughout the world. Thus, if the television standard system is different, the video and sound carrier frequencies and the frequency band width of the intermediate frequency signal are different. Since the present invention is most suited for implementation by an integrated circuit, as described previously, it is desired that an implementation of the present invention by an integrated circuit is provided which is adaptable to any frequency region of any television standard system in the world. In implementing the present invention by an integrated circuit, if a frequency region can be made as broad as possible, say as broad as 20MHz band to 50MHz band, then necessity of manufacturing different integrated circuits for different television standard systems can be eliminated and one type of integrated circuits can be manufactured on a mass production basis, with the result of a decreased manufacturing cost. Nevertheless, as a matter of practice, it is difficult to design an integrated circuit of a broader frequency range.

Therefore, if the same type of integrated circuits is employed in television receivers of different television standard systems such as the Japanese television standard system and (the video carrier frequency is 58.75MHz) and the French television standard system (the video carrier frequency is 28.05MHz), a problem arises that the automatic fine tuning control does not properly operate in either case. Thus, it follows that the integrated circuits implementing the present invention lack of versatility from the standpoint of different television standard systems.

Figure 8:
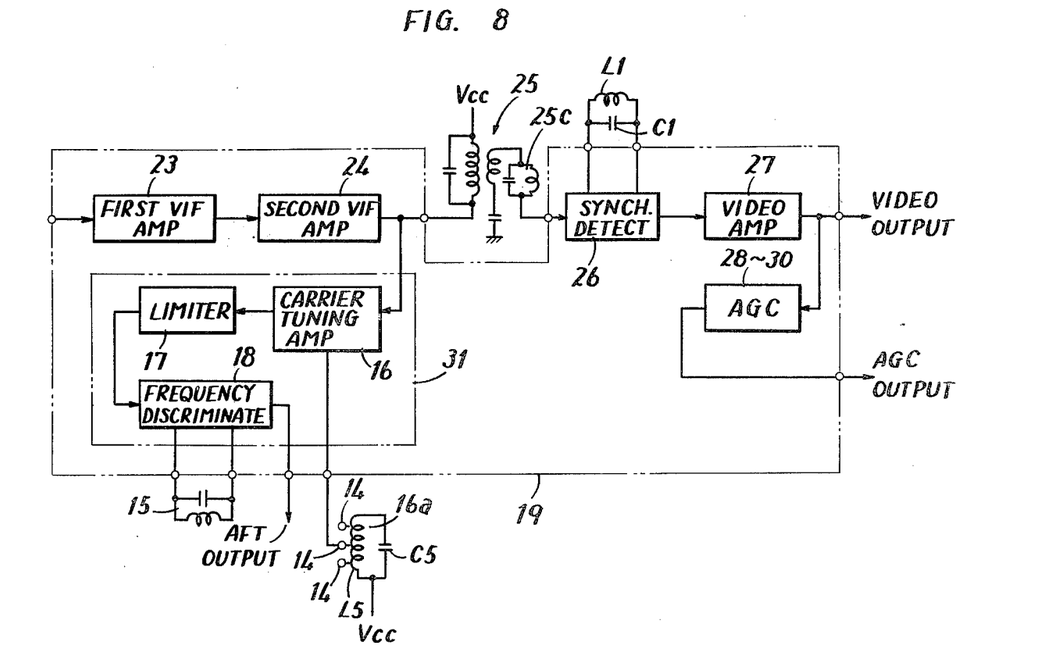
FIG. 8 shows a block diagram of a preferred embodiment of the present invention.

FIG. 8 shows a block diagram of a preferred embodiment of the present invention, which is particularly aimed to eliminate the disadvantages discussed in the preceding paragraph. Since the reference numerals 23 through 31 denote the same parts of the FIG. 5 embodiment, it is not believed necessary to describe the same in more detail, except for the block 31, which constitutes an essential feature of the FIG. 8 embodiment. Referring to FIG. 8, the automatic fine tuning control circuit 31 of the embodiment shown is comprised of a video carrier frequency tuning amplifier 16 coupled to the last stage of the second video intermediate frequency amplifier 24 through a direct current transfer path, an amplitude limiter 17 coupled to the tuning amplifier 16, and a frequency discriminator 18 coupled to the limiter 17. It is recalled that the tuning amplifier 16 is structured to have a low quality factor tuning characteristic as shown by the curve (C) in FIG. 3. To that end, the tuning amplifier 16 is coupled to a parallel circuit of an inductance coil L5 and a capacitor C5 to be connected externally of the integrated circuit 19. The coil L5 is formed of taps 14 such that one tap 14 of the coil L5 is selected externally of the integrated circuit depending on the frequency region to be used, as to be described subsequently. Again it is recalled that the video carrier tuning amplifier 16 coupled to the frequency discriminator 18 is structured that the same is of a high quality factor tuning characteristic with respect to the video carrier frequency as shown by the curve (C) in FIG. 3. To that end, the frequency discriminator 18 is coupled to a tuning circuit 15 to be connected externally of the integrated circuit 19.

Now assuming a case where the embodiment is employed in a television receiver for the Japanese television standard system having a video carrier wave of the frequency 58.75MHz, the tap position of the coil L5 is selected where the load of the said tuning amplifier 16, i.e. an impedance of the tuning circuit 16a implemented by the coil L5 and the capacitor C5 is large in view of a relatively high frequency region of the video carrier wave as compared with that of the French television standard system. By contrast, in case where the embodiment is employed in a television receiver for the French television standard system having the video carrier wave of 28.05MHz, the tap position of the coil L5 is selected where the said load impedance is small in view of a lower frequency region of the video carrier wave. The reason therefor will be described in more detail in the following with reference to FIGS. 9 and 10.

Figure 9:
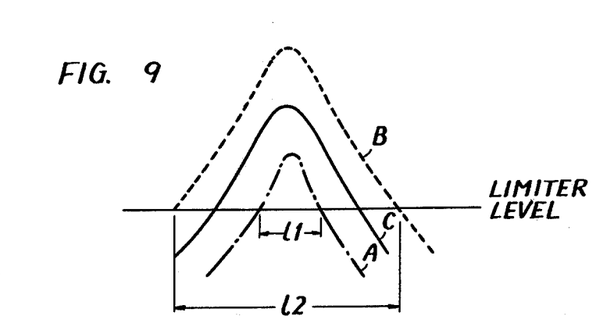
FIG. 9 shows several frequency characteristic curves of the tuning amplifier in conjunction with the limiter level of the limiter.
Figure 10:
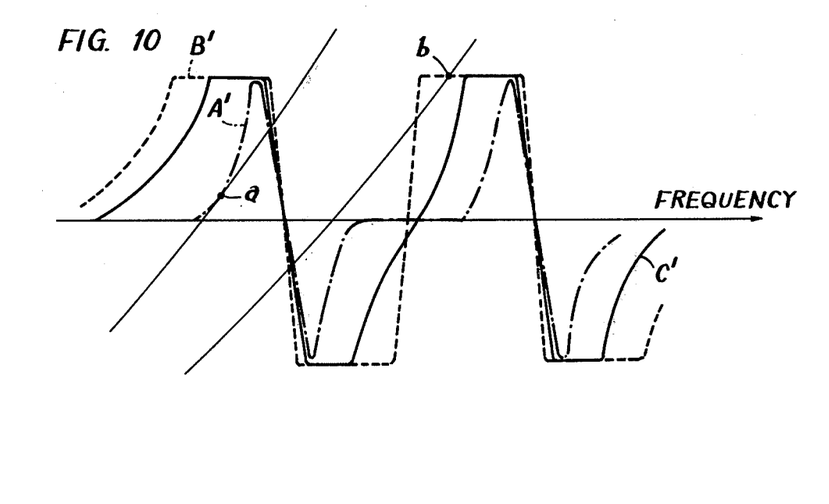
FIG. 10 shows several characterisitc curves in case of different frequency characteristic curves shown in FIG. 9.

FIG. 9 is similar to the frequency characteristic curve (C) in FIG. 3 but shows several frequency characteristic curves of the tuning amplifier 16 in conjunction with the limiter level of the limiter 17. FIG. 10 is similar to the output voltage versus frequency characteristic curve shown in FIG. 4 but shows several characteristic curves in case of different frequency characteristic curves shown in FIG. 9. Since generally an integrated circuit becomes of a lower gain in case of a higher frequency region, a tuning characteristic curve (A) as shown in FIG. 9 results, and the frequency range 11 to be amplitude limited by the limiter 17 becomes narrower, with the result that the S letter shaped characteristic curve of the automatic fine tuning control becomes narrower as shown in one-dot chain line (A') in FIG. 10. If and when the frequency width of the S letter shaped characteristic is too narrow, malfunction of the automatic fine tuning control occurs at the point (a), in case where the local oscillation frequency of the local oscillator in the tuner is shifted toward a lower frequency. On the other hand, in case of a lower frequency region the gain of an integrated circuit becomes larger and the tuning characteristic curve (B) as shown in FIG. 9 results, which in turn results in a broader frequency range 12 to be amplitude limited by the limiter 17. Accordingly, the frequency range of the S letter shaped characteristic curve of the automatic fine tuning control expands as shown in dotted line (B') in FIG. 10, with the result that malfunction occurs that the automatic fine tuning control is pulled in at the point (b) in FIG. 10 on the S letter shaped characteristic curve by virtue of the sound carrier signal, if and when the local oscillation frequency of the local oscillator in the tuner is shifted toward a higher frequency.

According to the embodiment shown, however, better selection of the tap position of the above described coil L5 makes it possible to achieve an ideal tuning characteristic curve, (C) as shown in a dotted line in FIG. 9 with respect to both higher and lower frequency regions of any television standard system. Accordingly, the S letter shaped characteristic curve of the automatic fine tuning control becomes as shown in the solid line (C') in FIG. 10, with the result that the malfunction does not occur at the above described points (a) and (b).

Figure 11:
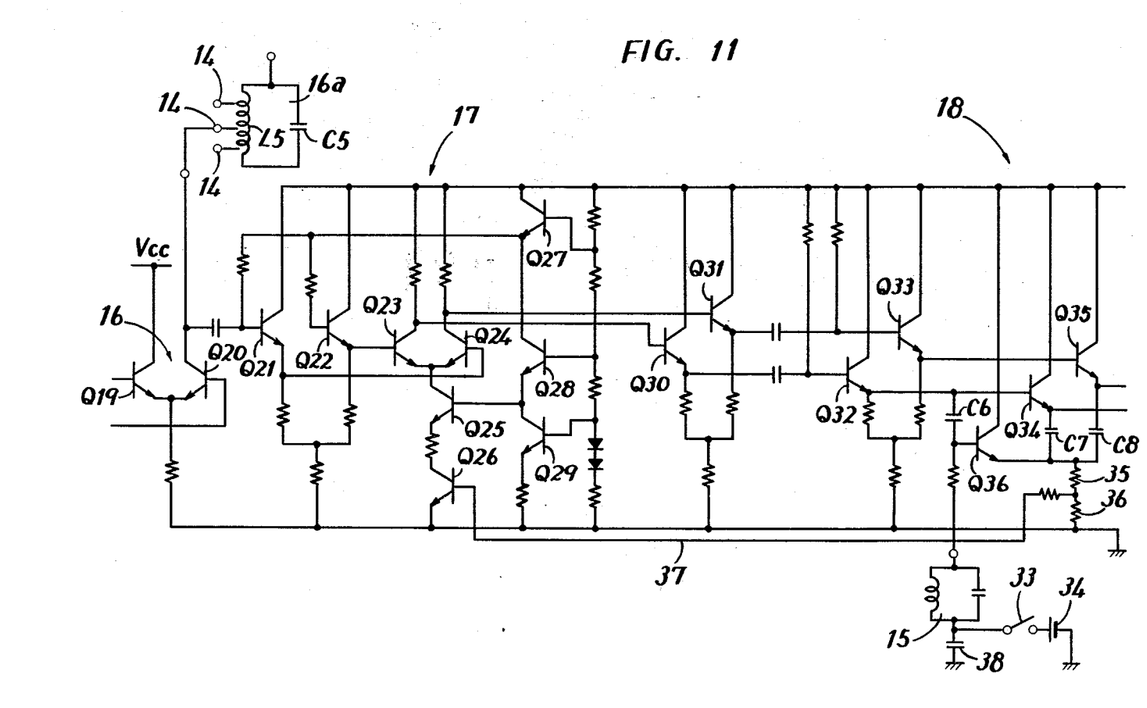
FIG. 11 shows a schematic diagram of the tuning amplifier, the limiter, and the frequency discriminator of the FIG. 8 embodiment.

FIG. 11 shows a schematic diagram of the tuning amplifier 16, the limiter 17, and the frequency discriminator 18 of the FIG. 8 embodiment. Referring to FIG. 11, the tuning amplifier 16 is implemented by a differential amplifier comprising paired transistors Q19 and Q20. The collector electrode of the transistor Q19 is coupled to a voltage source Vcc, while the collector electrode of the transistor Q20 is coupled to the above described tuning circuit 16a and also to the succeeding stage limiter 17. The output of the said tuning circuit 16 is applied to the limiter through an emitter follower implemented by a transistor Q21. The limiter 17 comprises a differential amplifier implemented by a pair of transistors Q23 and Q24 connected in series with an on/off control switching device implemented by a transistor Q26. One transistor Q23 of the differential amplifier is supplied with a constant current voltage through another emitter follower implemented by a transistor Q22. Therefore, only one of the paired transistors Q23 and Q24 becomes on or off depending on whether the signal as amplified by the tuning amplifier and applied to the transistor Q24 becomes higher or lower than the said constant direct current voltage, and the output as amplitude limited by the said operation is applied to the frequency discriminator 18 through the succeeding stage emitter followers implemented by paried transistors Q30 and Q37 and paired transistors Q32 and Q33 in the form of a differential signal. The transistor Q26 inserted in the constant current source of the limiter 17 has been supplied with a constant direct current voltage source implemented by a transistor Q25 through a line 37 to be described subsequently and has been conductive, which makes the limiter 17 operable, whereas if the said voltage is not applied the transistor turns off, which makes the limiter 17 inoperable.

The frequency discriminator 18 comprises another differential amplifier implemented by paired transistor Q34 and Q35. The signals from the above described emitter followers Q32 and Q33 are applied to the base electrodes of the paired transistors Q34 and Q35, with a phase difference of 180° therebetween. One of these signals is coupled through a capacitor C6 to the base electrode of a transistor Q36, whereby the said one signal is 90° phase shifted through the capacitor C6. The emitter electrode of the transistor Q36 is coupled through capacitors C7 and C8 to the emitter electrodes of the paired transistors Q34 and Q35, respectively. The emitter electrode of the transistor Q36 is connected through a series connection of resistors 35 and 36 to the ground. The junction of the resistors 35 and 36 is connected through the above described line 37 to the base electrode of the transistor Q26. The phase shift of 90° by means of the above described capacitance C6 corresponds to a case where no shift exists in the local oscillation frequency of the local oscillator in the tuner. If and when the local oscillation frequency is shifted, the tuning circuit 15 connected to the frequency discriminator externally of the integrated circuit 19 represents a reactance component. If no shift exists in the local oscillation frequency, then the tuning circuit 15 represents a pure resistance component. Thus, the amount of the said phase shift varies depending on the value of the said reactance component represented by the tuning circuit 15. In case of 90° phase shift, the paired transistors Q34 and Q35 generate a predetermined direct current output from the capacitors C7 and C8 connected to the emitters thereof, respectively. In case where the local oscillation frequency is shifted, the output comes to include a direct current voltage variation of the direction and magnitude depending on the said shift of the local oscillation frequency. Thus, the shift of frequency is frequency discriminated.

The tuning circuit 15 is connected through a capacitor 38 to the ground and the junction between the tuning circuit 15 and the capacitor 38 is connected through an external switch 33 and a direct current voltage source 34 provided externally of the integrated circuit 19. The switch 33, the voltage source 34, the line 37 and the transistor Q26 are provided for the purpose of selection of an automatic fine tuning control. Therefore, selection of the automatic fine tuning control will be described. If and when the automatic fine tuning control is desired, then the external switch 33 is closed. The direct current voltage from the voltage source 24 is applied through the transistor Q36 to the series connection of the resistors 35 and 36. Therefore, a divided voltage is developed at the junction between the resistors 35 and 36, which is applied through the line 37 to the base electrode of the transistor Q26. As a result, the transistor Q26 becomes conductive, whereby the limiter 17 becomes operable. On the other hand, if it is desired to make the automatic fine tuning control inoperable, a switch 33 is opened which makes the transistor Q26 turn off and the limiter 17 be disabled. As a result, Q27, Q28, and Q29 and resistors to the frequency discriminator 18. Thus, the automatic fine tuning control is made inoperable.

Meanwhile, referring to FIG. 11, the embodiment shown further comprises a series connection of transistors Q28, Q28, and Q29 and resistors connected to the base electrodes thereof. These connections merely form biase voltage sources.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. An automatic fine tuning circuit in a television receiver, comprising:

tuner means for selecting a television high frequency signal for converting said selected television high frequency signal into an intermediate frequency signal, said tuner means including voltage controlled variable reactance means constituting tuning circuit means, said intermediate frequency signal including a video intermediate frequency signal of a video carrier signal of a given video carrier frequency and a sound intermediate frequency signal of a sound carrier signal of a frequency lower than said video carrier frequency by a predetermined frequency difference, video intermediate frequency amplifying means coupled to said tuner means for amplifying the intermediate frequency signal from said tuner means, said video carrier signal and said sound carrier signal being liable to cause intermodulation for producing a pseudo carrier signal at a frequency higher than said video carrier frequency by said frequency difference between said video carrier frequency and said sound carrier frequency, synchronous detecting means coupled to said video intermediate frequency amplifying means for detecting a video signal from the amplified video intermediate frequency signal through synchronous detection, said synchronous detecting means including first video carrier frequency tuning circuit means of a relatively high quality factor tuning characteristic with respect to said video carrier frequency, and frequency discriminating means coupled to said video intermediate frequency amplifying means through direct current transfer path means for discriminating the frequency shift of the video carrier signal of the amplified video intermediate frequency signal from said given video carrier frequency for producing an automatic fine tuning control signal, said automatic fine tuning control signal being applied to said voltage controlled variable reactance device for an automatic fine tuning operation, said frequency discriminating means including second video carrier frequency tuning circuit means of a relatively low quality factor tuning characteristic with respect to said video carrier frequency.

2. An automatic fine tuning circuit in a television receiver in accordance with claim 1, wherein said second video carrier frequency tuning circuit means is selected to be of a low quality factor; such that even if said video carrier frequency of the amplified video intermediate frequency signal is shifted by said frequency difference in a lower frequency direction the shifted video carrier signal is dominant with respect to the shifted pseudo carrier signal, whereby malfunction of said automatic fine tuning circuit by virtue of said pseudo carrier signal is adapted to be prevented.

3. An automatic fine tuning circuit in a television receiver in accordance with claim 2, wherein said video intermediate frequency amplifying means, said synchronous detecting means and said frequency discriminating means are implemented in a single integrated circuit.

4. An automatic fine tuning circuit in a television receiver in accordance with claim 3, which further comprises first trap means coupled to said video intermediate frequency amplifying means adapted for absorbing a frequency lower than said sound carrier frequency by said frequency difference between said video carrier frequency and said sound carrier frequency.

5. An automatic fine tuning circuit in a television receiver in accordance with claim 3, which further comprises amplitude limiting means coupled between said second video carrier frequency tuning circuit means and said frequency discriminating means for limiting the amplitude of the output from said second video carrier frequency tuning circuit means.

6. An automatic fine tuning circuit in a television receiver in accordance with claim 5, wherein said second video carrier frequency tuning circuit means comprises amplifying means provided in said integrated circuit means, and resonance circuit means coupled to said amplifying means and provided externally of said integrated circuit.

7. An automatic fine tuning circuit in a television receiver in accordance with claim 6, wherein said resonance circuit means has been selected such that the impedance thereof achieves a desired amplification degree by said amplifying means with respect to the limiting level of said amplitude limiting means.

8. An automatic fine tuning circuit in a television receiver in accordacne with claim 3, which further comprises second trap means coupled to said video intermediate frequency amplifying means adapted for absorbing said sound carrier frequency.

* * * * *